Nov. 14, 1933.  G. ATHANASSIOU  1,935,006

TRACTOR-TRAILER COUPLING

Filed April 7, 1933

Inventor:
Georges Athanassiou
by S. Sokal,
Attorney.

Patented Nov. 14, 1933

1,935,006

UNITED STATES PATENT OFFICE 1,935,006

TRACTOR-TRAILER COUPLING

Georges Athanassiou, St. Marcel, Marseille, France

Application April 7, 1933, Serial No. 664,907, and in France April 18, 1932

1 Claim. (Cl. 280—33.1)

The present invention relates to an improved tractor-trailer coupling. The objects of the invention are to provide a coupling which enables a tractor and a trailer to be coupled together in various ways according to the conditions under which the trailer and tractor are intended to work. In the first instance, the improved trailer enables an absolutely rigid connection to be obtained between the tractor and the front wheels of the trailed vehicle so that no relative movement can take place between the tractor and the front shaft and wheels of the trailed vehicle, the two forming a rigid unit. With this rigid connection of the tractor and trailer, there is the possibility of either utilizing the front wheels of the trailed vehicle so that the connected ends of the two vehicles are supported by four wheels, or if preferred, putting the two front wheels of the trailed vehicle out of action so that the front end of the trailed vehicle rests rigidly upon the rear end of the tractor.

Another object of the invention is to provide means by which the trailed vehicle is connected to the tractor by the aid of the usual triangular pivoted drawbar. Another object of the invention is to provide a construction in which the point of connection of the trailed vehicle to the tractor is inside a circle about which the front shaft of the trailer rotates, the usual arrangement being such that the point of connection is outside the said circle, whereby a torsional strain is exerted upon the bearing about which the front shaft turns. The transition from one mode of working to another is very easily obtained.

The accompanying drawing shows by way of example one construction embodying the features of the invention.

Figure 1:
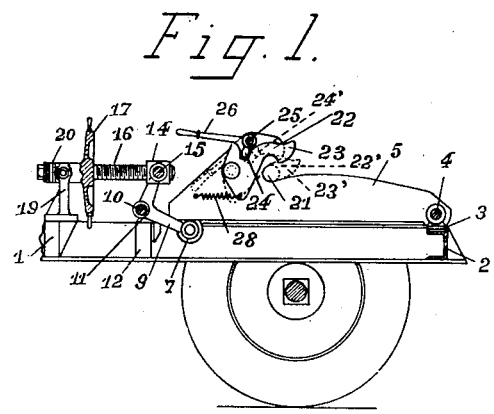
Fig. 1 is a section on line I—I of Fig. 2 showing the rear end of the tractor in elevation together with the coupling parts appertaining thereto.
Figure 2:
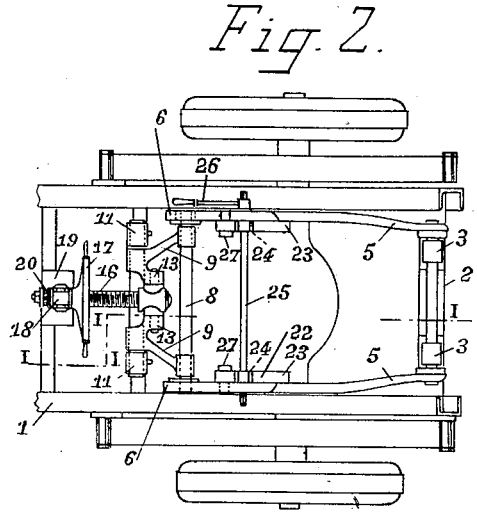
Fig. 2 is a plan corresponding to Fig. 1.

The chassis 1 of the tractor (Figs. 1 and 2) carries upon a rear transverse member 2 two bearings 3 in which is mounted a rocking shaft 4. Upon the rocking shaft 4 are fixed two plate shaped arms 5 extending towards the front of the tractor and adapted to rest with their front ends upon rollers 7. The rollers 7 are loosely mounted upon a transverse shaft 8 carried by the ends of the lower arms of a double bell crank lever 9, 9, which latter is fixed upon the transverse shaft 10 mounted in two bearings 11 carried by a transverse member 12 of the chassis 1. The upper arms 13, 13 of the bell crank lever carry upon the outer ends a nut 14 rotatably mounted in the arms by means of pins 15. The nut 14 co-operates with a screw spindle 16 adapted to be turned by means of a hand wheel 17 or any other suitable means for the purpose of operating the nut and turning the bell crank lever 9, 13. The other end of the screw spindle 16 is rotatably mounted in a sleeve 18 which is pivotally mounted in a bearing 19 fixed to the chassis 1. An anti-friction bearing 20 is provided to receive the thrust exerted upon the spindle 16 by the load acting upon the bell crank lever 9, 13.

The above device serves for turning the arms 5 about the axis of the shaft 4. It will be understood that any other means may be provided for operating the arms 5, for instance, hydraulic means or any other mechanical or electrical means.

The arms 5 have upper surfaces which, commencing from the rear end, are inclined first upwards, then have a horizontal middle and top portion, and are then inclined downwards, terminating in semicircular recesses 21 as shown. Each of these recesses may be closed by a pivoted member 22 having an end portion 23 which is so shaped that in its extreme closing position 23' it provides together with the semicircular recess of the arm 5 a circular hole for the reception of a transverse coupling bar carried by the trailer. The pivoted locking arms 22 are adapted to be operated simultaneously by means of small levers 24 which are carried by a transverse shaft 25 operable by means of a hand lever 26. Each lever 24 enters a recess of the corresponding locking arm 22 which latter are pivotally mounted by means of pins 27 upon the corresponding arms 5. The lower and outer surface of the ends 23 is so shaped as to enable the locking arms 22 to be raised automatically by the incoming coupling bar against the action of return springs 28 acting upon the arms 22, whereupon the arms 22 automatically engage over the coupling bar and hold same in position. It will thus be seen that the locking arms 22 are in the nature of automatic catches. In the locking position 22', 23' of the catches, the levers 24 are in the position 24' and hold the catches in their locking position.

The return springs 28 tend to hold the catches in their closing positions.

Figure 3:
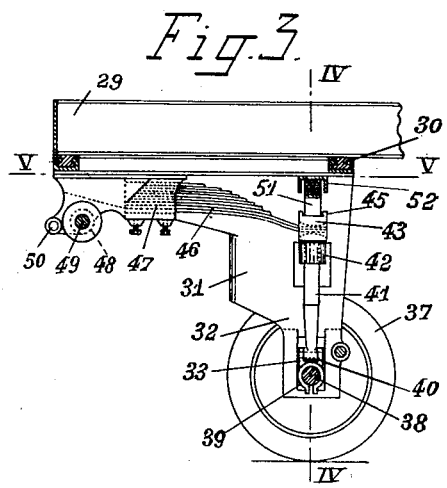
Fig. 3 is an elevation of the front part of the trailer partly in section.
Figure 4:
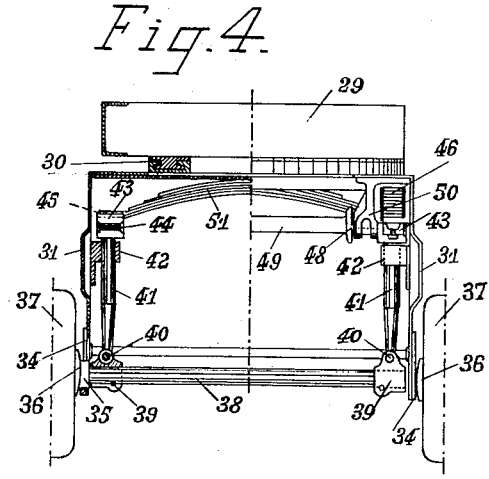
Fig. 4 is in its left portion a section on line IV—IV of Fig. 3 and in its right portion an end view seen from the right of Fig. 3.
Figure 5:
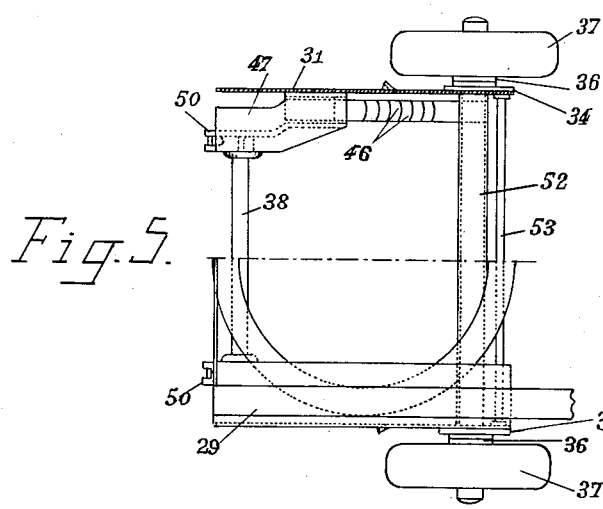
Fig. 5 is in its lower portion a plan corresponding to Fig. 3 and in its upper portion a section on line V—V of Fig. 3.

The trailer shown in Figs. 3, 4 and 5 has a chassis 29 upon which is mounted the usual swivel ring 30 about which the front axle of the trailer can turn. The frame carrying the front axle comprises two slotted members 31 having lower extensions 32 provided with vertical slot guides 33 reinforced by fittings 34. In the slot guides 33, 34 slide vertical bearings 35 provided with spherically shaped members 36 limiting lateral movement of the bearings. The wheels 37 are mounted upon a shaft 38 carrying the bearings 35. The shaft 38 also carries fixed thereto sleeves 39 to which are pivoted at 40 vertical supporting rods 41 the upper ends of which are guided in sleeves 42 fixed to the side frames 31. Each vertical supporting member 41 has fixed to its upper end above the sleeve 42 a head 43 which is provided with a corresponding longitudinal hole 44 and with a transverse groove 45. In the hole 44 is fixed the end of a spring 46, the other end of which is fixed in suitable manner to a forward and upper portion of the side frame 31. The two transverse grooves 45 serve for the reception of a transverse spring 51 the middle portion of which is fixed to a transverse member 52 of the shaft frame. The upper and forward portions of the side frames 31, 31 carry by means of eyes 48 a fixed coupling bar 49, and they also carry pins 50 or any other suitable means for the attachment of the usual triangular drawbar. The side frames 31 are connected by a transverse bar 53 to give the construction the required rigidity.

The operation is as follows:

In order to couple the trailer to the tractor, the two vehicles are moved towards each other so that the coupling bar 49 rides up upon the arms 5 of the tractor and into the recesses 21. The catch ends 23 of the arms 22 are automatically lifted by the bar 49 and then engage behind the bar and lock same in position, whereupon the levers 24 are moved by the lever 26 to lock the catches in their closed position. In this position of the parts, the tractor and the front carriage of the trailer are rigidly connected. The rigidly connected rear end of the tractor and the front carriage of the trailer rest upon four wheels. If, for any reason, it is preferred that these parts should rest only on two wheels, the arms 5 are lifted by turning the hand wheel 17 so as to lift the front carriage of the trailer from the ground. The front end of the trailer is then directly supported by the rear wheels of the tractor. By means of the usual triangular drawbar, the rear end of the trailer may be connected to the tractor, in which case there is an additional swivel connection between the front carriage of the trailer and the rear end of the tractor.

I claim:

In a tractor-trailer coupling the combination of: a main trailer chassis; a front under carriage swivelled to said main chassis; said undercarriage comprising in combination: two side members connected by transverse members; a coupling bar mounted near the top and front end of the said undercarriage; a wheel shaft carrying two wheels; bearings for said wheel shaft; vertical guides for said bearings in said side members; sleeve members fixed upon said shaft close to said side members; rods pivoted to said sleeve members; tubular guides for said rods fixed to said side members; longitudinal and transverse springs interposed between the upper ends of said rods and the top of the undercarriage; means for attaching to the front of said undercarriage an ordinary drawbar; a main chassis of the tractor; arms pivotally mounted upon said main chassis near the end of the chassis, said arms being formed with semi-circular recesses for the reception of the coupling bar carried upon the trailer; automatic spring operated coupling members pivotally mounted upon said arms and adapted to engage automatically and hold said coupling bar within said semi-circular recesses; hand operable means for locking said coupling members in the engaged position of the coupling bar, said means comprising: locking arms mounted upon a shaft and a hand lever for operating said shaft, said arms being provided with upper guide surfaces for guiding said coupling bar into engagement with said semicircular recesses; and hand operable means mounted upon the main chassis of the tractor for lifting said arms, for the purpose of raising the undercarriage of the trailer from the ground, said hand operable means comprising in combination bell crank levers for operating said arms, and nut and screw means for operating said bell crank levers, substantially as described.

GEORGES ATHANASSIOU.